Oct. 25, 1966   R. S. AMES ETAL   3,281,848
ATTENUATOR FOR RADIANT ELECTROMAGNETIC ENERGY
Filed June 29, 1964

INVENTORS
ROBERT S. AMES
JAMES W. KEPTNER
BY
ATTORNEY

United States Patent Office 3,281,848
Patented Oct. 25, 1966

3,281,848
ATTENUATOR FOR RADIANT ELECTROMAGNETIC ENERGY
Robert S. Ames, Tonawanda, and James W. Keptner, Buffalo, N.Y., assignors to Sylvania Electric Products Inc., a corporation of Delaware
Filed June 29, 1964, Ser. No. 378,496
3 Claims. (Cl. 343—703)

This invention relates generally to electromagnetic wave transmission systems, and is particularly concerned with new and improved devices for attenuating such waves. It is concerned principally, but in its broader aspects not exclusively, with a device for attenuating the electromagnetic energy transferred between an antenna and a proximate mating test antenna and minimizing reflection effects therebetween.

Attenuating devices of various types are widely used in connection with waveguide transmission systems and high frequency antenna measurement set-ups. Available attenuators exhibit a number of disadvantages in specific applications, however, one recurring problem being the fact that reflections are caused by the very presence of the attenuator in the transmission path, due to its configuration or the nature of the absorbing material used. These reflected waves interfere with the direct or incident waves to cause loss of efficiency in the transfer of power and possibly improper operation of the source. Attempts to minimize such reflections have included the use of auxiliary reactive elements to cause opposing cancelling reflections, but these are relatively complex and expensive. Another problem which arises with some types of attenuators is the difficulty of reproducing the desired attenuation characteristics in subsequent copies. Specific attenuator designs have been "tailor-made" to overcome such difficulties for individual configurations and applications; however, the problem persists of developing an attenuator design which is universally applicable to a number of applications and configurations with relatively minor changes.

The aforementioned problems are particularly illustrated by the attenuator design difficulties encountered by the applicants in providing a test set-up for a microwave radio altimeter transmitter-receiver having a pair of spiral antennas each about 4 inches in diameter, spaced about 6 inches apart, on centers. Referring to the block diagram of FIG. 1, which illustrates this application, a test set 10 simulating the transmission path of the altimeter signal is placed adjacent to the altimeter 12 with test set receiving antenna 14 coaxially aligned with the altimeter transmitting antenna 16 and test set transmitting antenna 18 coaxially aligned with the altimeter receiving antenna 20. The test set operates to "collect" the transmitted signal, evaluate the signal, and send the same or another signal to the altimeter receiver for test and evaluation. With the altimeter transmitting and receiving antennas placed immediately adjacent to mating test set antennas, impedance mismatches between facing antennas and cross-talk between the altimeter transmitting and receiving antennas occurred which were not present under normal operation of the altimeter. The problem of cross-talk between altimeter antennas was readily solved by shielding one set of mating antennas from the other. The mismatch problem, however, was probably due to wave energy being reflected back to the source and multiple reflections between facing antennas due to their close proximity. Interference between reflected and incident waves in a transmission line creates standing wave patterns of voltage and current, an undesirable result in that they cause transition losses and impair the operation of the modulated system because of the delayed reflection caused by a mismatch. For example, if the energy source is a magnetron or Klystron, the reflected energy could cause detuning of the source.

One of the two methods is normally employed to reduce standing waves in a transmission line. One is to place a lossy material between the source and the load so that incident energy is attenuated in initially passing through the absorber, and is further attenuated after reflection, thereby substantially masking or isolating reflected energy from the source. Another known technique is to "match" the source and load impedance by interposing an impedance matching network between them to reduce or eliminate the reflected waves in the line. These approaches proved to be unsatisfactory in the application depicted in FIG. 1.

With an appreciation of the shortcomings of available attenuating devices, applicants have as a general object of this invention to provide an attenuator for electromagnetic energy which is conveniently reproducible and easily adaptable to a wide variety of physical configurations.

A primary object of the invention is to provide a conveniently reproducible device for attenuating the electromagnetic energy transferred between an antenna and a proximate mating test antenna and minimizing reflection effects therebetween.

Another object is to provide an attenuator for electromagnetic waves radiated from a source which provides substantially reflectionless attenuation for energy passing through it and having conveniently determinable and reproducible attenuation and impedance characteristics.

A further object is to provide an attenuator for electromagnetic waves which is light and rigid and which is adaptable to a wide variety of physical configurations.

A still further object is to provide an attenuator for the electromagnetic energy radiated from an antenna wherein the attenuation and impedance are conveniently determined and reproduced to be suitable to the antenna characteristics.

Briefly, the foregoing objects are achieved by an attenuator comprising a symmetrical arrangement of strips of resistive material assembled edgewise with respect to the energy source. With only the edges of this structure facing the incident electromagnetic wavefront, a negligible area of reflecting surface is presented by the attenuator itself. As the energy passes through the resistive fin-like structure, a portion of the energy is absorbed and dissipated as heat, the amount of energy absorbed being readily determined by the dimension, number, and resistance value of the resistive strips. The symmetry and edge mounting of the attenuator structure render it adaptable to a variety of energy transmission path configurations.

In a preferred embodiment of the invention, thin boards of resistive material are assembled edgewise in a radial arrangement and supported in a rigid foam material having a dielectric constant closely approaching that of air to form a rigid, light-weight disk suitable for interposition between a microwave transmitting antenna and a proximate, co-axially aligned receiving antenna. The edge mounted resistor boards are capable of attenuating electromagnetic energy passing through the disk in either direction, with negligible reflection due to the disk. Thus, multiple reflections between the antennas are reduced, thereby reducing the amplitude of standing waves to a tolerable level. Further, reflections from the receiving antenna are substantially masked from the source. By designing a disk with the desired impedance characteristics, determined by the number, shape and resistance value of the resistance boards, the antennas can be effectively "matched." The radial arrangement is adaptable to any polarization of the transmitted wave.

Other objects, features and advantages of the invention, and a better understanding of its construction and operation will be apparent from the following detailed description taken in connection with the accompanying drawings in which.

The energy absorbing members employed in the attenuator structures of the present invention may comprise strips of resistive material cut to the desired dimension and shape from one of the commercially available composition or deposited film resistor boards. The composition resistor boards comprise thin sheets of a reasonably rigid non-conducting material, coated with a proper concentration of resistive material such as colloidal carbon in a suitable binder. The non-conducting material usually comprises one of the commercially known phenolic resin condensation products, such as "Bakelite"; hard fiber and dry cardboard are also used. Deposited film resistor boards comprise a thin stiff plastic non-conductor on which is deposited a very thin carbon or metallic film. The impedance characteristics of the resistor board with respect to radiant energy is determined by the "resistance per square" of the resistive surface. The "resistance per square" is the resistance of a square sheet of any dimension on a side, measured between metal strips fixed along parallel edges, and is independent of the linear dimension.

Figure 2:
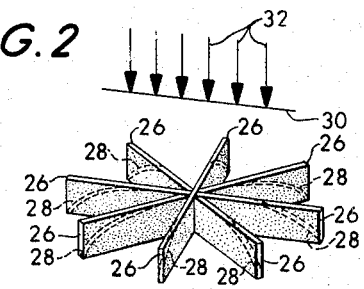
FIG. 2 is a prespective view of a radial attenuator structure in accordance with the invention.

Referring now to FIG. 2, there is shown a preferred embodiment of an attenuator in accordance with this invention comprising a plurality of resistive members 26 assembled edgewise in a radial arrangement. The specific eight-arm arrangement illustrated in FIG 2 is easily assembled by notching the centers of two of the strips 26, fitting them together, and securing four more half strips between each pair of the four arms with adhesive, for example.

The shape of each of the members 26 is determined by the physical configuration of the surrounding structure and the desired impedance and "matching" characteristics. For example, equal length, rectangular strips of resistive material may be used, as illustrated in FIG. 2, with the longitudinal edges of each of the strips lying in the plane of the radial pattern. This structure is particularly convenient, for example, in the application illustrated in FIG. 6 in which the attenuator is juxtaposed with a printed circuit equiangular, spiral antenna. On the other hand, if the attenuator is to be used for "matching," it may be desirable to provide a transverse taper in the impedance of the attenuator by physically tapering the radial arms as generally illustrated by dashed lines 28 in FIG. 2.

In use, the radial attenuator structure is mounted with the edges of the structural members 26 facing the incident electromagnetic wavefront, represented by line 30 and arrows 32 in FIG. 2, thereby presenting a reflecting surface of negligible area to the radiant energy source. As the energy passes through the fin-like attenuator structure, a portion of the energy is absorbed by the resistive material on the surfaces of the strips 26 and is dissipated as heat. Thus, electromagnetic energy incident on the radial structure is attenuated in a substantially reflectionless manner, the amount of energy absorbed being accurately determined by the "resistance per square," dimensions, and number of resistive members 26. Attenuation is determined primarily by the width and number of resistive strips, and the effective impedance presented by the attenuator to the source of electromagnetic waves is primarily dependent on the resistance value, shape, and number of strips.

Due to the symmetry and edge mounting of the radial structure, it is suitable for the attenuation of electromagnetic waves of horizontal, vertical, circular, or other polarizations. For proper operation, especially in microwave frequency applications, it is desirable that the radial arms 26 be rigidly held in substantially equiangular positions to avoid a change in the attenuation or impedance characteristics due to shifting of the resistive members relative to each other. To this end, and also to provide a light, rigid structure, the radial structure of FIG. 2 may be embedded or "potted" in a rigid foam material 34 to provide a disk-shaped package, as shown in FIG. 3.

Figure 3:
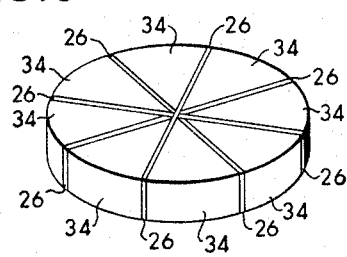
FIG. 3 is a perspective view of a disk-shaped, radial attenuator package in accordance with the invention.
Figure 4:
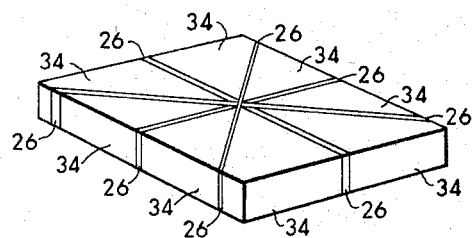
FIG. 4 is a perspective view of a rectangular-shaped, radial attenuator package in accordance with the invention.
Figure 5:
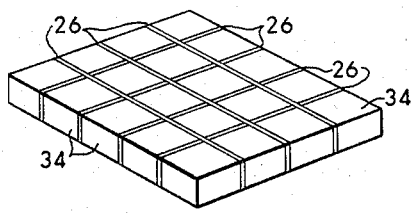
FIG. 5 is a perspective view of a rectangular-shaped, grid-type attenuator package in accordance with the invention.

The disk attenuator of FIG. 3 is suitable for use in electromagnetic wave transmission systems employing spiral antennas, circular waveguide, and the like. For use in rectangular waveguide, the radial attenuator concept with attendant advantages may easily be embodied in a rectangular package, as illustrated in FIG. 4; in this case, the resistive members 26 are appropriately dimensioned and foam material 34 is molded to the required rectangular length and width. The symmetrical, edgewise mounting concept of the present invention is not limited to a radial configuration of resistive strips, it being within the contemplation of the invention to assemble them in the grid arrangement of FIG. 5 supported in a rectangular foam package 34.

Figure 1:
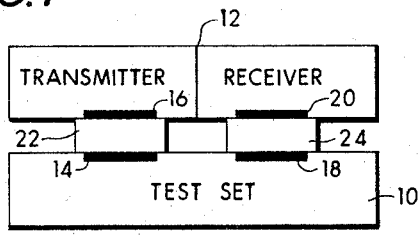
FIG. 1 is a block diagram illustrating a particular application of an attenuator to which previous reference has been made.
Figure 6:
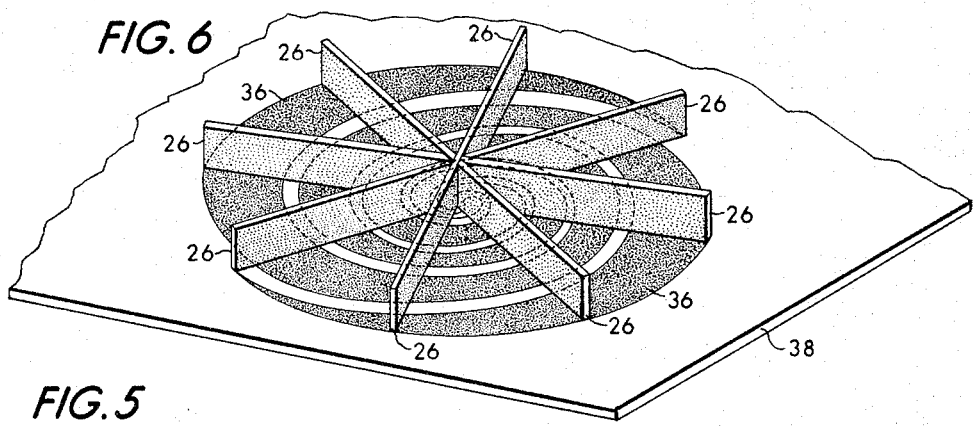
FIG. 6 is an isometric view showing a particular embodiment and application of the invention illustrating the juxtaposition of a radial attenuator structure and a spiral antenna.

FIG. 6 illustrates an embodiment of the attenuator employed by applicants to solve the attenuation and "matching" problems between equipment antennas and proximate mating test set antennas previously discussed in connection with FIG. 1. In this case, the altimeter employs printed circuit type equiangular spiral antennas and transmits a 4300 mc. FM/CW signal. The attenuator was fabricated from 400 ohms-per-square resistor board arranged in an eight radial arm array, the dimension of each arm being 1/32 x 11/32 x 2 inches. These values of resistance, dimension, and number of radial arms provided the desired attenuation and a satisfactory "matching" effect between the closely spaced mating antennas. To rigidly support the radial arms 26 the attenuator structure was foamed in place by a rigid poly-urethane foam material 34 (not shown in FIG. 6). As shown in FIG. 1, the attenuator disks were positioned between mating antennas 14–16 and 18–20 as attenuators 22 and 24, respectively, with the faces of the disks contacting the flat surfaces of respective spiral antennas. As shown in FIG. 6, the resistive strips 26 extend radially from the axis of spiral antenna 36, and are oriented perpendicularly to the surface of the antenna board 38. This edge mounting of the resistor boards and the coaxial, symmetrical, radial arrangement enables attenuation of circularly polarized electromagnetic waves passing through the disk in either direction, with negligible reflection due to the disk. Hence, reflections from a receiving antenna are substantially masked from the transmitting antenna and multiple reflections between antennas are reduced, thereby reducing the amplitude of standing waves to an acceptable level. The attenuator, in effect, simulates the transmission characteristics of air with the antennas spaced a long distance apart.

As an illustration of the improved performance obtained by using the above-described attenuator, VSWR ranged between 1:1 and 2:1 with various rotations of the disk over a test frequency range of 4.20 to 4.40 gc., whereas the VSWR ranged between 1.7:1 and 5.5:1 using conventional absorbers. Insertion losses ranged between 5.7 and 8.7 db as compared to a range of 3.0 to 14.0 db for conventional absorbers.

It is apparent, therefore, that the present invention provides a versatile, economical and conveniently reproducible device for providing substantially reflectionless attenuation of electromagnetic energy, along with impedance matching effects. The use of foam as a potting material for the edge mounted strips provides a light, rigid package adaptable to almost any physical configuration.

Although there has been described what are now considered to be preferred embodiments of the invention, modifications falling within the scope and spirit of the invention will occur to those skilled in the art. It is the intention of the applicants, therefore, that the invention is not to be limited by what has been specifically illustrated and described, except as such limitations appear in the appended claims.

What is claimed is:

1. A device adapted to be interposed between a directional transmitting antenna and a proximate, coaxially aligned, directional receiving antenna for attenuating electromagnetic energy transferred between said antennas and minimizing reflection effects therebetween, said device comprising a plurality of radially arranged strips of resistive material supported in a rigid foam material having a dielectric constant substantially the same as air, the center of the radial arrangement being coaxially aligned with said antennas, said strips being oriented with the longitudinal edges thereof lying in the plane of said transmitting and receiving antennas, respectively, and being dimensioned and having a resistance value to provide a desired attenuation to electromagnetic energy transferred between said antennas.

2. A device according to claim 1 in which said strips of resistive material include a resistive film deposited on a non-conducting board.

3. A device according to claim 2 in which said rigid foam material is poly-urethane.

References Cited by the Examiner

UNITED STATES PATENTS

| | | | |
|---|---|---|---|
| 2,724,112 | 11/1955 | Hepperle | 343—18 |
| 2,760,171 | 8/1956 | King | 333—98 |
| 3,078,461 | 2/1963 | Dwyer | 343—18 |
| 3,124,798 | 3/1964 | Zinke | 343—18 |
| 3,192,531 | 6/1965 | Cox et al. | 343—895 |

OTHER REFERENCES

Warters: "The Effects of Mode Filters on the Transmission Characteristics of Circular Electric Waves in a Circular Waveguide," The Bell System Technical Journal, vol. 37, May 1958, pp. 662 and 663, TK1B435.

HERMAN KARL SAALBACH, *Primary Examiner.*

ELI LIEBERMAN, M. NUSSBAUM,
*Assistant Examiners.*